United States Patent [19]

Balzer

[11] Patent Number: 4,722,396

[45] Date of Patent: Feb. 2, 1988

[54] PROCESS FOR OIL RECOVERY FROM SUBTERRANEAN RESERVOIR ROCK FORMATIONS

[75] Inventor: Dieter Balzer, Haltern, Fed. Rep. of Germany

[73] Assignee: Huels Aktiengesellschaft, Marl, Fed. Rep. of Germany

[21] Appl. No.: 879,749

[22] Filed: Jun. 27, 1986

[30] Foreign Application Priority Data

Jun. 29, 1985 [DE] Fed. Rep. of Germany ....... 3523355

[51] Int. Cl.$^4$ ............................................. E21B 43/22
[52] U.S. Cl. .................................... 166/274; 166/275; 252/8.554
[58] Field of Search ....................... 166/273, 274, 275; 252/8.55 D, 8.554

[56] References Cited

U.S. PATENT DOCUMENTS

| 4,293,428 | 10/1981 | Gale et al. | 166/275 X |
| 4,448,697 | 5/1984 | McCoy et al. | 252/8.55 D |
| 4,457,373 | 7/1984 | Balzer et al. | 166/275 X |
| 4,478,281 | 10/1984 | Balzer et al. | 252/8.55 D X |
| 4,485,873 | 12/1984 | Balzer et al. | 252/8.55 D X |
| 4,501,675 | 2/1985 | Malloy et al. | 252/8.55 D |
| 4,542,790 | 9/1985 | Balzer | 252/8.55 D X |
| 4,561,501 | 12/1985 | Shaw et al. | 252/8.55 D X |
| 4,582,138 | 4/1986 | Balzer | 252/8.55 D X |

*Primary Examiner*—George A. Suchfield
*Attorney, Agent, or Firm*—Millen & White

[57] ABSTRACT

Oil is extracted from subterranean reservoir rock formations by injection of a solution or dispersion of a carboxymethylated oxalkylate R—$(OC_3H_6)_m(OC_2H_4)_n OCH_2COOM$ in admixture with a more hydrophobic tenside, for example a mono- or dialkylbenzenesulfonate, a petroleum sulfonate or an alkanesulfonate. The process is especially suited for reservoirs governed by strong temperature fluctuations or by a temperature gradient.

15 Claims, No Drawings

PROCESS FOR OIL RECOVERY FROM SUBTERRANEAN RESERVOIR ROCK FORMATIONS

BACKGROUND OF THE INVENTION

The present invention relates to a process for oil recovery, especially by tenside flooding and/or micellar polymer flooding in medium-salinity to higher-salinity reservoirs.

In the extraction of oil from reservoir rock formations, generally only a fraction of the originally present oil is successfully transported by means of primary recovery processes. In this procedure, the oil passes to the surface by means of the natural reservoir pressure. In secondary oil recovery, water is usually injected into one or several injection wells of the formation, and the oil is driven to one or several production wells and then brought to the surface. This so-called waterflooding as a secondary measure is relatively inexpensive and correspondingly is utilized frequently, but it produces in many cases only a slight additional oil extraction from the reservoir.

An effective displacement of the oil, more expensive but required for national economic purposes in view of future oil shortages, is accomplished by tertiary measures. These include processes wherein either the viscosity of the oil is lowered and/or the viscosity of the subsequent flooding water is raised and/or the interfacial surface tension between water and oil is reduced.

Most of these processes can be classified either as solution or mixture flooding, thermal oil recovery methods, tenside or polymer flooding and/or as a combination of several of these processes. Thermal recovery methods include injection of steam or hot water or they take place as subterranean combustion. Solution or mixture processes involve injecting a solvent for petroleum into the reservoir; this solvent can be a gas and/or a liquid.

Tenside processes are based primarily on an extensive lowering of interfacial tension between oil and flooding water. A distinction is made, depending on tenside concentration and in some cases type of tenside and additives, among tenside-supported waterflooding, usual tenside flooding (low-tension flooding), micellar flooding, and emulsion flooding. Furthermore, wettability of the rock surface as well as the mobility conditions are of great importance. Favorable mobility relationships between oil and water are attained by polymers.

Quite particularly, this invention concerns problems in processes for reservoirs governed by strong temperature fluctuations or by a temperature gradient. Since the temperature of reservoir rock formations is determined essentially by the thermal flow from the interior of the earth into the surface region, fluctuating temperatures are due either to strong inclinations of the reservoir or to interference with natural events. The latter includes, for example, the injection of water during waterflooding.

Waterflowing of long duration, especially when conducted on high-temperature reservoirs, ordinarily leads to the formation of a strong temperature gradient. This is especially pronounced in high-temperature offshore reservoirs flooded with cold seawater, resulting in strong cooling even of the more remote injection zones. Thus, for example in reservoirs in the North Sea region, temperature spans have been known to exist of between about 10° C. close to the injection probes and about 100° C. in more remote areas. However, the tenside flooding method utilized in each case is to be optimally effective, if at all possible, within the entire temperature range. This, of course, pre-supposes that the tenside remains stable for a long period of time under reservoir conditions.

Another problem of tenside flooding is that most of the tensides suitable for this purpose, such as, for example, alkyl-, alkylaryl- or petroleum sulfonates, have a very low tolerance limit with respect to the salinity of the reservoir waters. Even salt concentrations of merely 1,000 ppm are often deemed problematic, the sensitivity of these tensides against alkaline earth ions being especially pronounced. The upper critical limit concentration of salinity is given as 500 ppm in U.S. Pat. No. 4,110,228. In the presence of high salt concentrations, precipitation products in the form of insoluble salts are created when using the aforementioned tensides. As a result, on the one hand, material needed for the desirable surfactant action along the water-oil interface is lost; on the other hand, the precipitation products can lead to plugging of the formation. As is known, many reservoir waters contain substantially higher salinities; a very considerable portion of the light oil deposits in North America have salinities around 100,000 ppm and higher, the content of dissolved alkaline earth ions being considerable in most cases. Also, the seawater frequently injected for secondary measures in offshore reservoirs exhibits, with a TDS value of about 36,000 ppm and alkaline earth ion concentrations of about 2,000 ppm, a salinity lying far above the limit of tolerance.

Typical tensides tolerant even of extremely high total salinities and corresponding alkaline earth ion concentrations and capable of highly effective oil mobilization, are compounds of the type of carboxymethylated oxethylates, ether sulfonates and ether sulfates, as described in U.S. Pat. Nos. 4,293,428; 4,299,711, 4,485,873; as well as No. EP=B1-0 064 384. However, while the ether sulfates (cf. DOS No. 2,558,548) are considered to be not temperature-stable, the carboxymethylated oxethylates and the ether sulfonates are considered to display long-term temperature stability even under drastic conditions.

Carboxymethylated oxethylates, as tensides for tenside flooding and/or micellar tenside flooding, can be tailored to the given reservoir. As demonstrated in U.S. Pat. Nos. 4,457,373 and 4,485,873, the so-called phase inversion temperature (PIT) is the criterion for this adaptation of the tenside to the given reservoir system. If the PIT of the system of crude oil/formation water/tenside/optional additives is at the reservoir temperature or up to 10° C. higher, then optimum action of the tenside can be expected with regard to oil mobilization and oil layer formation. A relatively minor deviation of the local reservoir temperature from its average value by +5° C., which is quite commonplace, does not appreciably affect tenside activity. However, strong temperature gradients with temperature spans of between 10° and 100° C. drastically impair the effectiveness of the carboxymethylated oxethylates. This can be impressively demonstrated by measuring the interfacial surface tension of oil-aqueous tenside solution in dependence on the temperature (cf. D. Balzer, Proceedings 2nd European Symposium Enhanced Oil Recovery, Paris 1982). According thereto, the interfacial tension of the system crude oil/formation water/carboxymethylated oxethylate passes through a deep, narrow minimum at a certain temperature ordinarily lying close to the PIT. In contrast, with markedly lower or higher temperatures, for this reservoir system the tenside exhibits a very much lower interfacial activity and consequently restricted effectiveness in oil mobilization. Thus, with a carboxymethylated oxethylate utilized in connection with a reservoir system wherein the PIT is about 95° C., a strong additional oil extraction in the form of an oil layer can be observed at 90° C. In contrast, if the test temperature is lowered to 20° C., only a small amount of residual oil—and even this amount only in the form of an oil-in-water emulsion—can be liberated.

SUMMARY OF THE INVENTION

Therefore, it is an object of this invention to provide conditions for using carboxymethylated oxethylates which, in medium- to high-salinity reservoir systems, show a strong oil-mobilizing activity and have long-term temperature stability even under drastic conditions, which ensure their effectiveness even in reservoirs with fluctuating temperatures.

Upon further study of the specification and appended claims, further objects and advantages of this invention will become apparent to those skilled in the art.

These objects have surprisingly been attained by providing a process for obtaining oil from subterranean rock formations penetrated by at least one injection and one production well, by injecting a solution or dispersion of a carboxymethylated oxalkylate of the formula $R-(OC_3H_6)_m(OC_2H_4)_nOCH_2COOM$ wherein R is a linear or branched aliphatic residue of 6-20 carbon atoms, a monoalkylaromatic residue of 3-18 carbon atoms in the alkyl group or a di- or oligoalkylaromatic residue of 1-18 carbon atoms per alkyl group, wherein the total number of carbon atoms in the alkyl chains amounts to 5 to 40, m is 0 to 20, n is 3 to 100, M is an alkali or alkaline earth metal ion or ammonium, and the degree of carboxymethylation is between 10 and 100%, into an injection bore, wherein the carboxymethylated oxalkylate is utilized in admixture with a more hydrophobic tenside.

E.g., said solution or dispersion comprises
(A) a tenside mixture of 0-90 wt% of ethoxylates of the formula

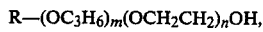

$R-(OC_3H_6)_m(OCH_2CH_2)_nOH,$ and 10-100 wt% of carboxymethylated oxalkylates of the formula

$R-(OC_3H_6)_m(OC_2H_4)_nOCH_2COOM$ wherein R is a hydrocarbon aliphatic group of 6-20 carbon atoms, a monoalkylaromatic group of 3-18 carbon atoms in the alkyl group or a di- or oligoalkyl-aromatic residue of 1-18 carbon atoms per alkyl group, the total number of carbon atoms in all the alkyl chains being 4 to 40, m is 0 to 20, n is 3 to 100, M is an alkali or alkaline earth metal ion or ammonium, and the aryl groups are of 6-10 carbon atoms,
and
(B) a sulfonate tenside which is more hydrophobic than said tenside mixture.

Thus, according to this invention, use is made of hydrophilic carboxymethylated oxethylates, preferably those which are soluble in the water of the respective reservoirs at least to an extent of about 1.0% by weight and up to about 15% by wt., preferably about 10.0% by weight, in admixture with suitable hydrophobic tensides, e.g., those substantially insoluble in the water of the respective reservoir (the upper solubility limit typically being about 1,000 ppm). More generally, the hydrophobic tenside will be more hydrophobic than the carboxymethylated oxethylates by having a water solubility which is lower by a factor of at least 10 based on the solubility of the carboxymethylated oxethylate. Suitable hydrophobic tensides include alkylbenzene-, dialkylbenzene-, alkane and petroleum sulfonates. The simultaneous utilization of cotensides, such as mono- or polyhydric alcohols, or alkyl ethers of polyhydric alcohols is advantageous.

The carboxymethylated oxethylates useful according to this invention can be prepared, for example, in accordance with German Pat. No. 2,418,444 by reaction of oxethylates of the formula $R-(OC_2H_4)_nH$ or $R-(OC_2H_3(CH_3))_m(OC_2H_4)_nH$ with a salt of chloroacetic acid in the presence of an alkali hydroxide or other bases. However, other preparation methods are likewise suitable. R, in this connection is a saturated or unsaturated, straight-chain or branched hydrocarbon aliphatic residue, e.g., alkyl residues of 6-20, preferably 8-16 carbon atoms, or a monoalkylaryl residue of 3-18, preferably 4-16 carbon atoms in the alkyl chain, or a dialkylaryl or oligoalkylaryl residue of 1-18 carbon atoms per alkyl group, wherein the total number of carbon atoms in the alkyl chains is 4 to 40, e.g., 5-40, m has values of 0-20, preferably 0-10, especially 1-10, n has values of 3-100, preferably 4-50, especially 4-30. The cation M can be sodium, potassium, lithium, ammonium, calcium, magnesium and the like.

Suitable alcohols, the oxethylates of which form the basis for the carboxymethylates, are, for example: hexyl alcohol, octyl alcohol, nonyl alcohol, decyl alcohol, undecyl alcohol, lauryl, tridecyl, myristyl, palmityl and stearyl alcohol, but also unsaturated alcohols, such as, for example, oleyl alcohol. The alkyl chain can be straight chained or branched. For example, suitable alkyl phenols include: butylphenol, pentylphenol, hexylphenol, octylphenol, nonylphenol, decylphenol, undecylphenol, dodecylphenol, tridecylphenol, as well as the corresponding dialkyl phenols, such as, for example, 2-methyl-4-tridecylphenol, 2-dodecyl-4-ethylphenol, dinonylphenol, etc. These alkyl chains also can be normal or branched. It is also possible to use trialkyl phenols, such as tri-n-butylphenol, tri-tert-butylphenol, dimethylnonylphenol or tetralkyl phenols, such as tetrabutylphenol, etc. Suitable aryl moieties typically include those of 6-10 C atoms.

Oxethylation can be performed in the presence of catalytic amounts of alkali hydroxide with 0-20, preferably 0-10, especially 1-10 moles of propylene oxide per mole of hydroxy compound and thereafter with 3-100, preferably 4-50, especially 4-30 moles of ethylene oxide per mole of hydroxy compound. The resultant oxethylates are mixtures of homologs. The subsequently conducted carboxymethylation can be complete in case of proper conductance of the process, so that the carboxymethylated oxethylates are purely anionic tensides. Alternatively, in case of incomplete carboxymethylation, the products still contain more or less substantial amounts of unreacted oxethylate. Consequently, the formula $R-(OC_3H_6)_m(OC_2H_4)_nOCH_2COOM$ frequently means a mixture also including varying amounts of unreacted oxethylate R—(OC$_3$H$_6$)$_m$(OC$_2$H$_4$)n—OH. Accordingly, a degree of carboxymethylation can be defined. It has been found that mixtures with a degree of carboxymethylation of 10 to 100%, preferably 50 to 100%, and quite particularly 70 to 100% are very effective.

Suitable more hydrophobic tensides are monoalkylbenzenesulfonates of 6-20, preferably 8-16 carbon atoms in the optionally branched alkyl chain, or dialkylbenzenesulfonates of 1-20 carbon atoms per optionally branched alkyl chain, wherein the total number of carbon atoms in the alkyl chains per molecule is 8-30, preferably 10-24. It is also possible to employ mixtures of mono- and dialkyl sulfonates. Such alkyl- or dialkylbenzenesulfonates can be conventionally prepared by alkylation of benzene, for example with linear or branched olefins in the presence of suitable alkylating catalysts and subsequent sulfonation. Likewise suitable as the hydrophobic tenside component are alkanesulfonates of 10-30, preferably 12-24 carbon atoms, which can be produced, for example, by sulfoxidation of paraffins. The petroleum sulfonates obtained from the oil layer are also suitable.

The tenside solution or dispersion to be injected typically has a concentration of about 0.1–20% by wt. The slug size of the tenside-containing liquids usually is 0.01–2 pore volumes (PV).

It has been found in many tests that the addition of cotensides is of advantage, e.g., mono- or polyhydric alcohols, or alkyl ethers of polyhydric alcohols can be utilized as the co-solvent. If added in sufficient quantities, the partially greatly turbid dispersion of the effective tenside mixture is transformed into a waterclear solution. At the same time, the degree of tenside-caused oil extraction increases as found in linear displacement tests on drill cores. Suitable cotensides include monohydric alcohols of 3-8 carbon atoms, for example, propanol isomers, butanol isomers, pentanol isomers, etc., or polyhydric alcohols of 3-8 carbon atoms, such as propanediol, butanediol, pentanediol, etc., or alkyl (e.g., of 1-5 C atoms) ethers of polyhydric alcohols (e.g., those mentioned above), such as ethylene glycol monoethyl ether, ethylene glycol monoisopropyl ether, ethylene glycol monobutyl ether, diethylene glycol monobutyl ether, etc.

The tenside or tenside—cotenside mixtures of this invention must be adapted to the conditions of the respective reservoir system. Critical features in this connection are the components of the reservoir water and, if the latter is not reinjected, also the composition of the flooding water, as well as the character of the reservoir oil, the temperature or temperature range of the reservoir, optionally the composition of the gaseous phase and the reservoir pressure. Preliminary tests for adaptation of the tenside system to the reservoir conditions involve phase investigations well known from the literature, for example along the lines of a phase volume diagram (cf. H. Kraft, G. Pusch, SPE/DOE-Paper 10714) wherein the volumes of the top, middle and lower phases are determined in dependence on the temperature, using a mixture of reservoir oil, reservoir water or flooding water, and tenside or tenside/cotenside. A tenside or tenside/cotenside combination is desirable which leads to a phase characteristic that is extensively independent of the temperature, with pronounced formation of a middle-phase microemulsion. Such a condition by itself, however, is not enough. Thus, investigations on the system of decane/seawater in the presence of alkylbenzenesulfonate/nonylphenol oxethylates/isobutanol revealed that, although the desired extensively temperature-independent phase characteristic existed, the oil extraction obtained parallel thereto in flooding experiments was not achieved. Further required preliminary tests for adapting the tenside system to the reservoir, directly demonstrating its effectiveness, therefore involve linear displacement tests on model formations of sandstone or sand, the so-called flooding tests described in the examples. In contrast with the phase experiments wherein an equilibrium condition is under consideration, as can hardly be realized during tenside flooding, the displacement tests take into account the non-equilibrium processes taking place in reality within the reservoir.

Flooding tests, if at all possible on original drill core material and, as far as necessary, under reservoir conditions, are useful for laboratory-style optimizing of the tenside or tenside/cotenside system with respect to its liquid form as the effective medium (solution, dispersion or emulsion), its concentration, and its volume, and furthermore with respect to the type, concentration, and volume of any polymer solution to be utilized as a mobility buffer. (The use of an emulsion has already been disclosed, e.g. in U.S. Pat. No. 4,457,373.

Based on these preliminary tests, the tenside solution or dispersion is introduced into the reservoir by means of injection pumps. This is done in the form of slugs, i.e., limited volumes of 0.01-2 PV (=pore volume of reservoir), preferably 0.02-1.2 PV. The size of the tenside slug depends on the tenside concentration and on the usual economic conditions. Ordinarily, the tenside concentration is 0.1 to 20%, preferably 0.2 to 10%. This tenside concentration includes only the carboxymethylated oxethylate and the added hydrophobic tenside. The relative amounts of these two components are related to each other in a weight ratio of 1:5 to 5:1, e.g., 4:1 to 1:4, preferably 1:3 to 3:1. If a cotenside (cosolvent) is added, it is present in a weight ratio based on the total amount of the two other tensides of 1:5 to 5:1.

Suitably, waterflooding is conducted before the tenside liquid is injected, the produced formation water being preferably utilized as the flooding water. In special cases, it may also be advantageous to flood with a water of a composition different from that of the formation water. This can be advantageous for logistic reasons, or e.g., where it is desirable to condition the reservoir with regard to a certain salinity. The size of the flooding water slug is usually 0.01-4 PV, preferably 0.1-2 PV.

For reasons of mobility control—as mentioned—as well as for protection of the tenside liquids from penetrating flooding water, a polymer solution can be injected into the reservoirs after the final tenside liquid, e.g., formation or flooding water containing a water-soluble, viscosity-raising polymer. For this purpose, a polymer or a polymer mixture is dissolved in the flooding water in such a concentration that the viscosity is 1.2 to 10 times as high as that of the oil under reservoir conditions. Suitable polymers include biopolymers, such as, for example, xanthan gum, or cellulose derivatives and polyacrylamides which still exhibit adequate viscosity in the presence of the given salinity and do not result in any precipitation. Suitably, injection of the polymer solution is followed by normal waterflooding as a driving stimulus. This is continued as long as oil can be economically extracted.

Unless indicated otherwise herein, all details of this invention are fully conventional and described, for example, in U.S. Pat. Nos. 4,478,281, 4,542,790, 4,457,373 and 4,485,873, which disclosures are incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

The following examples constitute linear displacement tests either on sandpiles or sandstone drill cores as laboratory-style model formations.

In order to produce a sandpile, a thermostatable steel pipe having a length of 70 cm and a diameter of 5 cm, equipped with a temperature measuring means and a manometer, sealable at both ends by threaded closures with capillary inlet and pressure-maintaining valve outlet, was charged with edge-rounded quartz sand. Thereafter, the sandpile was wetted with salt water by means of a diaphragm pump and brought to the desired temperature by a thermostat. Pressure transmitters were used to determine the permeability of the pile. Then the latter was saturated with a model oil (n-decane or crude oil), during which step the adsorbed water content could be simultaneously determined. Subsequently, salt water was injected at a rate of about 1 m/d in the amount of 1.5 PV (1 PV about 750 ml), thus obtaining a degree of inundation of 98-100%. After this so-called waterflooding, first the tenside mixture and then the polymer solution were injected, both in the form of a slug. As a driving medium, additional salt water was forced in.

For producing the model formations of consolidated rock, cylindrical drill cores having a length of 50 cm and a diameter of 8 cm made of Bentheim sandstone were embedded in epoxy resin. In the 90° C. tests, thinner drill cores (diameter 4 cm) were embedded with low-melting metal mixtures. The pore volumes were about 600 and 150 ml, respectively, the flooding rate was about 0.5 m/d. The temperature control in case of the resin-embedded cores took place by means of an open temperature bath. Otherwise there were no differences in the operation of these model formations as compared with those of the sandpiles. In all displacement tests, after injection of the tenside system, 0.6 PV of a 0.2% solution of polymer "Flocon" 4800 (xanthan, Pfizer) in the respective salt water was injected into the formation.

EXAMPLES 1 TO 27

The examples according to this invention are illustrated in the table below. The following materials were utilized:

Oils:

| | |
|---|---|
| D | n-decane 96% |
| N | 35° API crude oil (61% paraffinic, 16% naphthenic and 23% aromatic hydrocarbons), $\eta 20°$ C. = 6 mPa · s |
| A | 33° API crude oil (70% paraffinic, 11% naphthenic and 18% aromatic hydrocarbons), $\eta 20°$ C. = 19 mPa · s |

Salt Waters:

| | |
|---|---|
| S | synthetic seawater (1.12% $Na^+$, 0.035% $K^+$, 0.047% $Ca^{++}$, 0.133% $Mg^{++}$, 2.02% $Cl^-$, 0.27% $SO_4^{2-}$) |
| O | formation water (1.45% $Na^+$, 0.042% $K^+$, 0.101% $Ca^{++}$, 0.015% $Mg^{++}$, 0.016% $Sr^{++}$, 0.0165% $Ba^{++}$, 2.46% $Cl^-$, 0.07% $HCO_3^-$) |
| T | synthetic formation water (1.91% $Na^+$, 0.035% $K^+$, 0.047% $Ca^{++}$, 0.133% $Mg^{++}$, 3.23% $Cl^-$, 0.27% $SO_4^{2-}$) |

Carboxymethylated Oxethylates:

| | |
|---|---|
| $a_1$ = | carboxymethylated nonylphenol oxethylate sodium salt with 8 mol EO/mol, degree of carboxymethylation (CM) 86%, |
| $a_2$ = | carboxymethylated nonylphenol oxethylate sodium salt with 10 mol EO/mol, CM 87%, |
| $a_3$ = | carboxymethylated nonylphenol oxethylate sodium salt with 15 mol EO/mol, CM 85%, |
| $a_4$ = | carboxymethylated nonylphenol oxethylate sodium salt with 4.1 mol EO/mol, CM 86%, |
| $a_5$ = | carboxymethylated "Alfol" 1214 oxethylate sodium salt with 10 mol EO/mol, CM 70%, |
| $a_6$ = | carboxymethylated dinonylphenol oxethylate sodium salt with 30 mol EO/mol, CM 56%, |
| $a_7$ = | carboxymethylated dinonylphenol block propoxy oxethylate sodium salt with 3 mol PO/mol and 12 mol EO/mol, CM 75% |

Hydrophobic Tensides (Sulfonates)

| | |
|---|---|
| $b_1$ = | isooctylbutylbenzenesulfonate active substance 52%, neutral oil 0.1% |
| $b_2$ = | isooctylbutylbenzenesulfonate/isododecylbutylbenzenesulfonate 1:1 active substance 49%, neutral oil 3% |
| $b_3$ = | petroleum sulfonate "Witco TRS 10" |
| $b_4$ = | dodecylbenzenesulfonate (huels "MARLON A") |
| $b_5$ = | isododecylbutylbenzenesulfonate/isohexadecylbutylbenzenesulfonate 1:1 active substance 42%, neutral oil 9.5% |
| $b_6$ = | isododecylbutylbenzenesulfonate active substance 46%, neutral oil 5.8% |
| $b_7$ = | heptadecanesulfonate monosulfonate 84%, disulfonate 11%, $Na_2SO_4$ 4% |

Cotensides

| | |
|---|---|
| $c_1$ = | isobutanol (99.5%) |
| $c_2$ = | n-butanol (99.9%) |
| $c_3$ = | ethylene glycol butyl monoether (99%) |
| $c_4$ = | ethylene glycol isopropyl monoether (99%) |

The blocks of examples, for example 1 through 3, 4 through 6, or 7 through 10, demonstrate that, on account of the tenside mixtures of this invention, a predominantly quantitative oil extraction of the formation is possible in a temperature range of between 20° and 90° C. An objectionably high pressure buildup is not observed. The addition of a cotenside is advantageous. The composition of the oil and/or of the water, as well as varying the structure of the carboxymethylated oxethylates or that of the sulfonates does not give rise to any basic differences, as shown further below in the table.

| No. | Formation Permeab. (D) | Oil | Salt Water | Temperature (°C.) | Tenside carboxymethyl. Oxethylate | System Sulfonate | Cotenside | $\Delta E_w$ (% OOIP) | $\Delta E_T$ (% OOIP) | $\Delta p$* (bar/m) |
|---|---|---|---|---|---|---|---|---|---|---|
| 1 | Sand, 0.7 | D | S | 20 | $a_1$, 2% | $b_1$, 2% | $c_1$, 4% | 67 | 32 | 1.1 |
| 2 | Core, 1.1 | D | S | 54 | $a_1$, 2% | $b_1$, 2% | $c_1$, 4% | 51 | 34 | 0.6 |
| 3 | Sand, 0.5 | D | S | 90 | $a_1$, 2% | $b_1$, 2% | $c_1$, 4% | 67 | 17 | 1.2 |
| 4 | Core, 1.9 | N | S | 20 | $a_1$, 2% | $b_1$, 2% | $c_1$, 4% | 46 | 37 | 1.0 |
| 5 | Core, 1.9 | N | S | 54 | $a_1$, 2% | $b_1$, 4% | $c_1$, 4% | 55 | 32 | 0.6 |
| 6 | Sand, 0.6 | N | S | 90 | $a_1$, 2% | $b_1$, 2% | $c_1$, 4% | 85 | 13 | 1.7 |
| 7* | Core, 1.2 | D | S | 20 | $a_2$, 2% | $b_1$, 2% | $c_1$, 4% | 56 | 36 | 0.7 |
| 8 | Core, 1.6 | D | S | 20 | $a_2$, 2% | $b_1$, 2% | $c_1$, 4% | 52 | 46 | 0.8 |
| 9 | Core, 1.4 | D | S | 54 | $a_2$, 2% | $b_1$, 2% | $c_1$, 4% | 57 | 42 | 0.5 |
| 10 | Sand, 0.6 | D | S | 90 | $a_2$, 2% | $b_1$, 2% | $c_1$, 4% | 77 | 15 | 1.7 |
| 11 | Core, 1.6 | D | S | 54 | $a_2$, 2% | $b_1$, 2% | — | 52 | 17 | 0.6 |
| 12 | Sand, 0.7 | D | S | 90 | $a_2$, 2% | $b_1$, 2% | — | 84 | 8 | 1.0 |
| 13 | Sand, 0.7 | D | S | 20 | $a_1$, 2% | $b_1$, 2% | $c_1$, 2% | 75 | 25 | 3.0 |
| 14 | Sand, 0.7 | D | O | 20 | $a_3$, 2% | $b_2$, 2% | $c_2$, 4% | 75 | 24 | 1.8 |
| 15 | Sand, 0.9 | D | O | 90 | $a_3$, 2% | $b_2$, 2% | $c_2$, 4% | 86 | 10 | 1.6 |
| 16 | Core, 1.8 | D | T | 20 | $a_2$, 2% | $b_2$, 2% | $c_3$, 4% | 49 | 37 | 1.1 |
| 17 | Core, 1.9 | D | T | 90 | $a_2$, 2% | $b_2$, 2% | $c_3$, 4% | 64 | 21 | 0.8 |
| 18 | Sand, 0.7 | D | S | 20 | $a_2$, 1.5% | $b_3$, 1.5% | $c_1$, 3% | 76 | 17 | 1.6 |
| 19 | Sand, 0.7 | D | S | 90 | $a_2$, 1.5% | $b_3$, 1.5% | $c_1$, 3% | 76 | 21 | 1.3 |
| 20 | Sand, 0.7 | A | S | 20 | $a_3$, 2% | $b_2$, 2% | $c_1$, 4% | 62 | 16 | 2.5 |
| 21 | Core, 2.1 | A | S | 54 | $a_3$, 2% | $b_2$, 2% | $c_1$, 4% | 66 | 28 | 0.7 |
| 22 | Core, 1.8 | D | S | 20 | $a_4$, 2% | $b_4$, 2% | $c_1$, 4% | 47 | 52 | 1.4 |
| 23 | Sand, 0.8 | D | S | 90 | $a_4$, 2% | $b_4$, 2% | $c_1$, 4% | 76 | 19 | 1.9 |
| 24 | Sand, 0.7 | D | S | 20 | $a_5$, 2% | $b_5$, 2% | $c_4$, 3% | 78 | 22 | 1.8 |
| 25 | Sand, 0.5 | D | S | 90 | $a_5$, 2% | $b_5$, 2% | $c_4$, 3% | 90 | 10 | 1.7 |
| 26 | Sand, 0.6 | D | S | 20 | $a_6$, 2% | $b_6$, 2% | $c_2$, 4% | 72 | 28 | 2.0 |
| 27 | Sand, 0.5 | D | S | 90 | $a_6$, 2% | $b_6$, 2% | $c_2$, 4% | 84 | 15 | 1.4 |
| 28 | Core, 1.7 | D | S | 20 | $a_7$, 2% | $b_1$, 2% | $c_2$, 4% | 47 | 33 | 0.7 |
| 29 | Core, 1.4 | D | S | 90 | $a_7$, 2% | $b_1$, 2% | $c_1$, 4% | 48 | 12 | 0.5 |
| 30 | Core, 1.9 | D | S | 20 | $a_7$, 2% | $b_7$, 2% | $c_1$, 4% | 54 | 30 | 0.5 |
| 31 | Sand, 0.7 | D | S | 90 | $a_7$, 2% | $b_7$, 2% | $c_1$, 4% | 82 | 12 | 1.0 |

*Tenside slug 0.15 PV
**$\Delta E_w$ and $\Delta E_T$ mean oil extraction (% OOIP) by means of waterflooding and tenside flooding
***$\Delta_p$ is the maximum pressure gradient
****Original Oil in Place The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for recovering oil from a subterranean reservoir rock formation penetrated by at least one injection well and at least one production well, comprising injecting through said injecting well an aqueous solution or dispersion of effective amounts of
   (A) a tenside mixture of
   0–90 wt% of ethoxylates of the formula

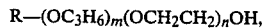
   $R—(OC_3H_6)_m(OCH_2CH_2)_nOH$, and
   10–100 wt% of carboxymethylated oxalkylates of the formula

   $R—(OC_3H_6)_m(OC_2H_4)_nOCH_2COOM$ wherein R is a hydrocarbon aliphatic group of 6–20 carbon atoms, a monoalkylaromatic group of 3–18 carbon atoms in the alkyl group or a di- or oligoalkylaromatic residue of 1–18 carbon atoms per alkyl group, the total number of carbon atoms in all the alkyl chains being 4 to 40, m is 0 to 20, n is 3 to 100, M is an alkali or alkaline earth metal ion or ammonium, and the aryl groups are of 6–10 carbon atoms, and
   (B) a sulfonate tenside which is more hydrophobic than said tenside mixture (A),
   and recovering said oil through said production well.

2. A process of claim 1, wherein said more hydrophobic tenside is a monoalkylbenzenesulfonate of 6–20 carbon atoms in the alkyl chain; a dialkylbenzenesulfonate of 1–20 carbon atoms per alkyl chain, the total number of carbon atoms in both alkyl chains being 8–30; a petroleum sulfonate; or an alkanesulfonate of 10–30 carbon atoms.

3. A process of claim 1, wherein the total concentration of said tensides (A) and (B) in the solution or dispersion to be injected is 0.1–20 wt%.

4. A process of claim 1, wherein the slug size of the tenside-containing liquid is 0.01–2 pore volumes.

5. A process of claim 1, wherein the weight ratio of the carboxy-methylated oxalkylate to that of the more hydrophobic tenside is 5:1 to 1:5.

6. A process of claim 1, wherein formation water or flooding water is injected into the reservoir after injection of the tenside slug.

7. A process of claim 6, wherein the formation or flooding water contains a water-soluble, viscosity-raising polymer.

8. A process of claim 1, wherein the tenside mixture further comprises a cosolvent in a weight ratio of 1:5 to 5:1 based on the total weight of tensides (A) and (B).

9. A process of claim 8, wherein the cosolvent is a mono- or polyhydric alcohol or an alkyl ether of a polyhydric alcohol.

10. A process of claim 2, wherein the weight ratio of the carboxy-methylated oxalkylate to that of the more hydrophobic tenside is 5:1 to 1:5.

11. A process of claim 1, wherein the tenside mixture (A) comprises 70-100 wt% of carboxymethylated oxalkylates.

12. A process of claim 1, wherein n is 4-30.

13. A process of claim 10, wherein the tenside mixture (A) comprises 70-100 wt% of carboxymethylated oxalkylates.

14. A process of claim 7, wherein the polymer is a xanthan gum; a cellulose derivative or a polyacrylamide.

15. A process of claim 1, wherein the reservoir is subject to strong temperature fluctuations or has a temperature gradient.

* * * * *